US011167717B2

United States Patent
Nakajima et al.

(10) Patent No.: US 11,167,717 B2
(45) Date of Patent: Nov. 9, 2021

(54) AIRBAG APPARATUS WITH PROTRUSION PARTS

(71) Applicant: Autoliv Development AB, Vargarda (SE)

(72) Inventors: Yutaka Nakajima, Kanagawa (JP); Takanari Muroya, Kanagawa (JP); Ryota Ishigaki, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 74 days.

(21) Appl. No.: 16/609,092

(22) PCT Filed: Jan. 12, 2018

(86) PCT No.: PCT/JP2018/000685
§ 371 (c)(1),
(2) Date: Oct. 28, 2019

(87) PCT Pub. No.: WO2018/198443
PCT Pub. Date: Nov. 1, 2018

(65) Prior Publication Data
US 2020/0086821 A1 Mar. 19, 2020

(30) Foreign Application Priority Data

Apr. 28, 2017 (JP) .............................. JP2017-090627

(51) Int. Cl.
*B60R 21/233* (2006.01)
*B60R 21/205* (2011.01)
(Continued)

(52) U.S. Cl.
CPC .......... *B60R 21/233* (2013.01); *B60R 21/205* (2013.01); *B60R 21/2338* (2013.01);
(Continued)

(58) Field of Classification Search
CPC .... B60R 2021/0009; B60R 2021/0023; B60R 2021/0048; B60R 2021/23308;
(Continued)

(56) References Cited

U.S. PATENT DOCUMENTS 7,862,073 B2 * 1/2011 Thomas ................ B60R 21/231
280/729
8,070,183 B2 * 12/2011 Kumagai .............. B60R 21/239
280/743.2
(Continued)

FOREIGN PATENT DOCUMENTS

| JP | 2013014176 A | 1/2013 |
| JP | 2016132385 A | 7/2016 |
| JP | 2017061230 A | 3/2017 |

OTHER PUBLICATIONS

International Search Report of the International Searching Authority for PCT/JP2018/000685 dated Apr. 3, 2018.
(Continued)

*Primary Examiner* — Laura Freedman
(74) *Attorney, Agent, or Firm* — Stoel Rives LLP

(57) ABSTRACT

An airbag apparatus with a cushion that expands and deploys from in front of a seat is provided. The cushion includes a front restraining part that restrains a head of a passenger from the front of a vehicle. The cushion further includes protrusion parts that are provided beside the front restraining part in the width direction of the vehicle and protrude and expand further towards the rear of the vehicle than the front restraining part. Inner tethers inside the cushion are connected to the front restraining part and to which tension is applied to pull the front restraining part towards the front of the vehicle. Outer tethers are connected to the protrusion parts and to which tension is applied to pull the protrusion parts towards the front of the vehicle. When (Continued)

tension is applied to the inner tethers, force towards the inner tethers is applied to the outer tethers.

16 Claims, 9 Drawing Sheets

(51) Int. Cl.
  *B60R 21/2338* (2011.01)
  *B60R 21/00* (2006.01)
(52) U.S. Cl.
  CPC .......... *B60R 2021/0009* (2013.01); *B60R 2021/0048* (2013.01); *B60R 2021/23308* (2013.01); *B60R 2021/23382* (2013.01)
(58) Field of Classification Search
  CPC ........ B60R 2021/23382; B60R 21/205; B60R 21/233; B60R 21/2338
  See application file for complete search history.

(56) References Cited

U.S. PATENT DOCUMENTS

| | | | |
|---|---|---|---|
| 8,678,429 B2 | 3/2014 | Nagasawa et al. | |
| 9,187,055 B1* | 11/2015 | Genthikatti | B60R 21/233 |
| 9,358,945 B2* | 6/2016 | Yamada | B60R 21/268 |
| 9,561,774 B2* | 2/2017 | Cheng | B60R 21/239 |
| 9,676,355 B2* | 6/2017 | Kruse | B60R 21/0132 |
| 9,758,123 B2 | 9/2017 | Yamada et al. | |
| 9,840,223 B2* | 12/2017 | Choi | B60R 21/233 |
| 10,293,775 B2* | 5/2019 | Wang | B60R 21/205 |
| 10,427,638 B2* | 10/2019 | Choi | B60R 21/233 |
| 10,493,941 B2* | 12/2019 | Szawarski | B60R 21/2338 |
| 10,632,957 B2* | 4/2020 | Bausch | B60R 21/233 |
| 10,654,439 B2* | 5/2020 | Kitagawa | B60R 21/2334 |
| 10,661,746 B2* | 5/2020 | Yamada | B60R 21/205 |
| 10,926,731 B2* | 2/2021 | Nakajima | B60R 21/216 |
| 10,926,734 B2* | 2/2021 | Yamada | B60R 21/233 |
| 10,994,692 B2* | 5/2021 | Aranzulla | B60R 21/2338 |
| 11,007,967 B2* | 5/2021 | Zink | B60R 21/233 |
| 2018/0134244 A1* | 5/2018 | Choi | B60R 21/2338 |
| 2018/0297548 A1* | 10/2018 | Abramoski | B60R 21/233 |
| 2018/0354450 A1* | 12/2018 | Yamada | B60R 21/239 |
| 2020/0023804 A1* | 1/2020 | Weiss | B60R 21/2338 |

OTHER PUBLICATIONS

Translation of the International Search Report of the International Searching Authority for PCT/JP2018/000685 dated Apr. 3, 2018.

\* cited by examiner

[FIG. 1]
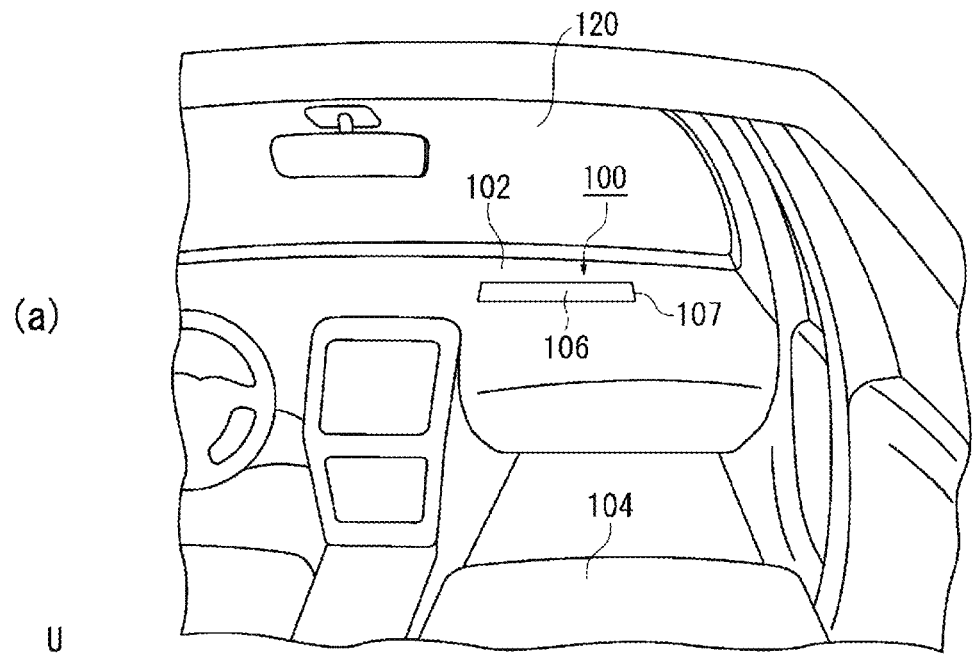
(a)
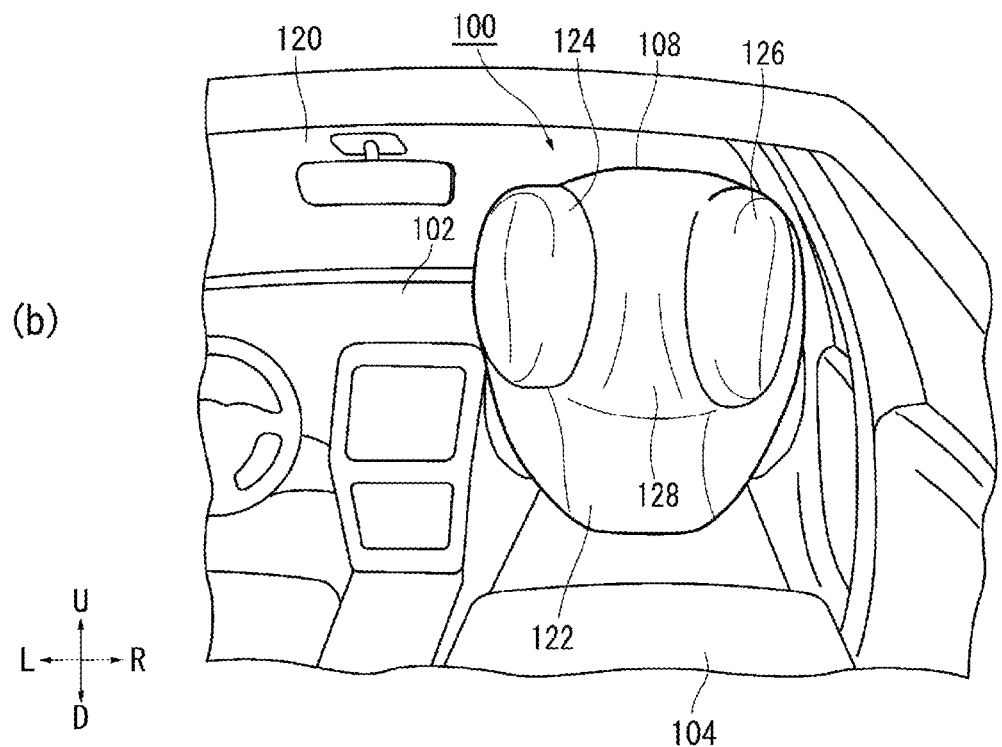
(b)

[FIG. 2]
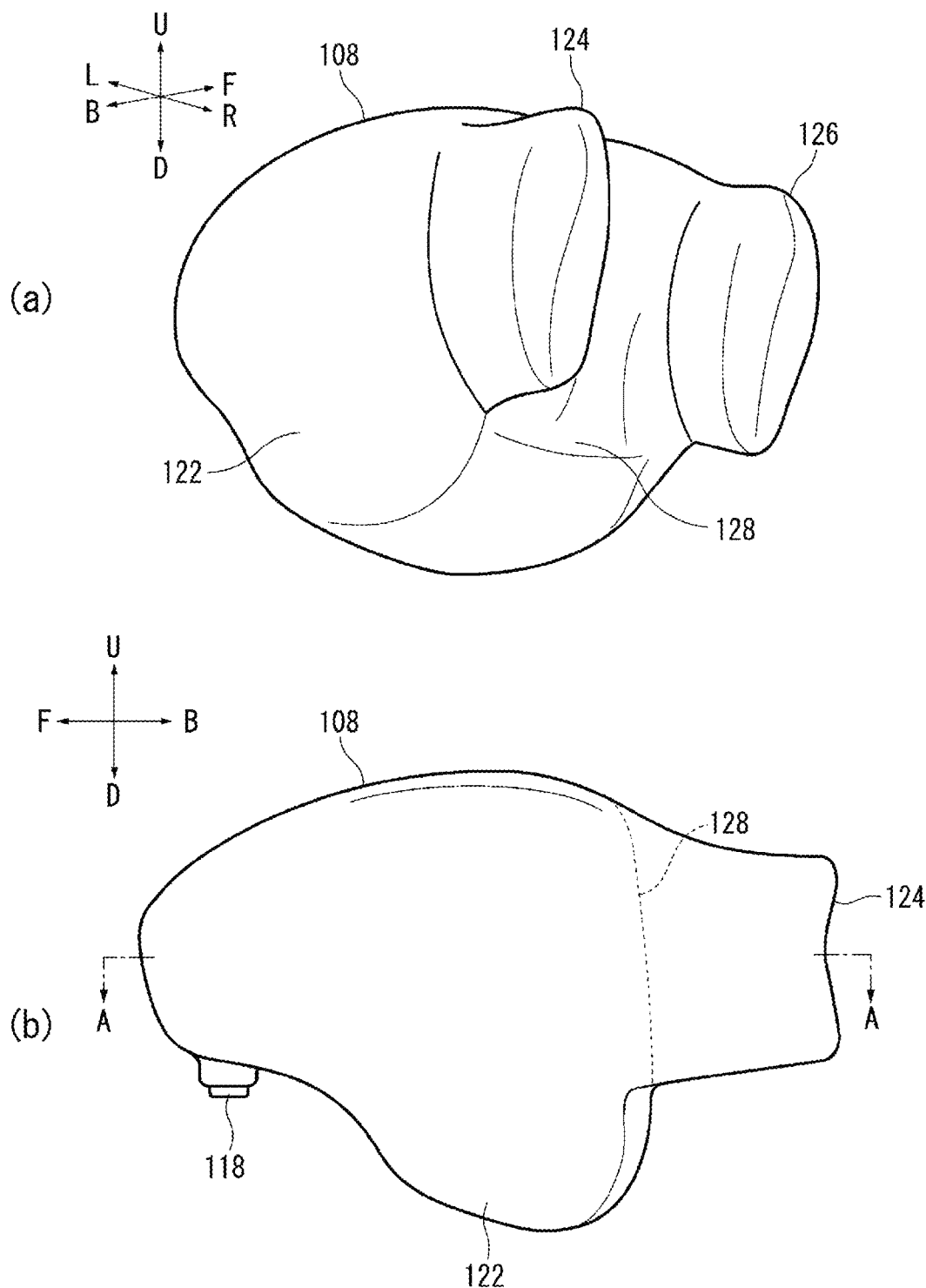

[FIG. 3]
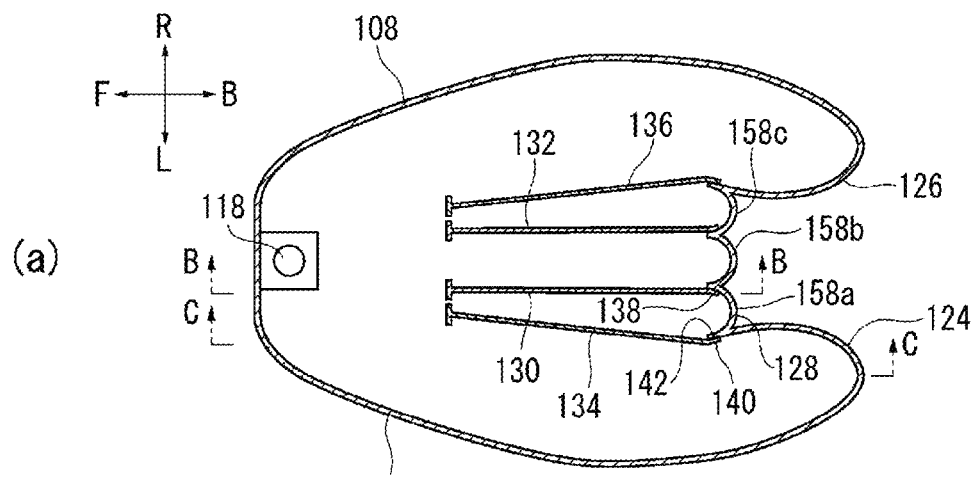
(a) A-A LINE CROSS SECTION
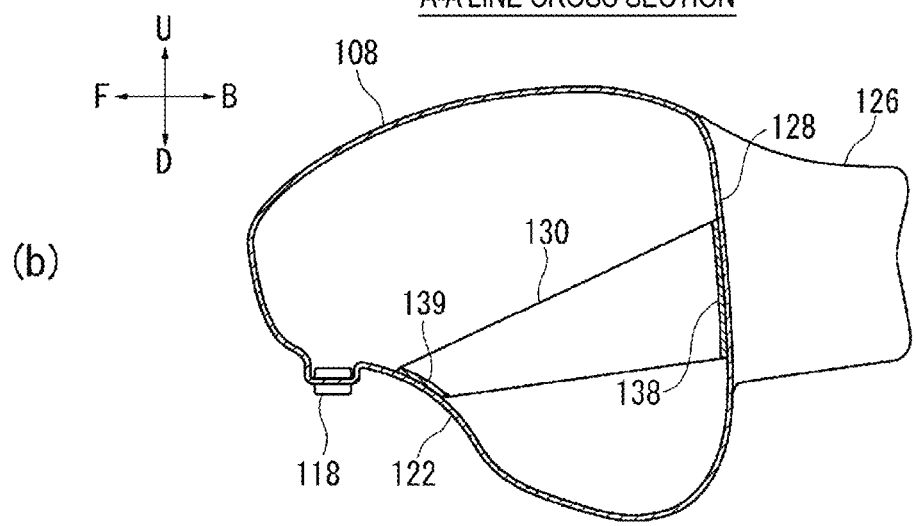
(b) B-B LINE CROSS SECTION
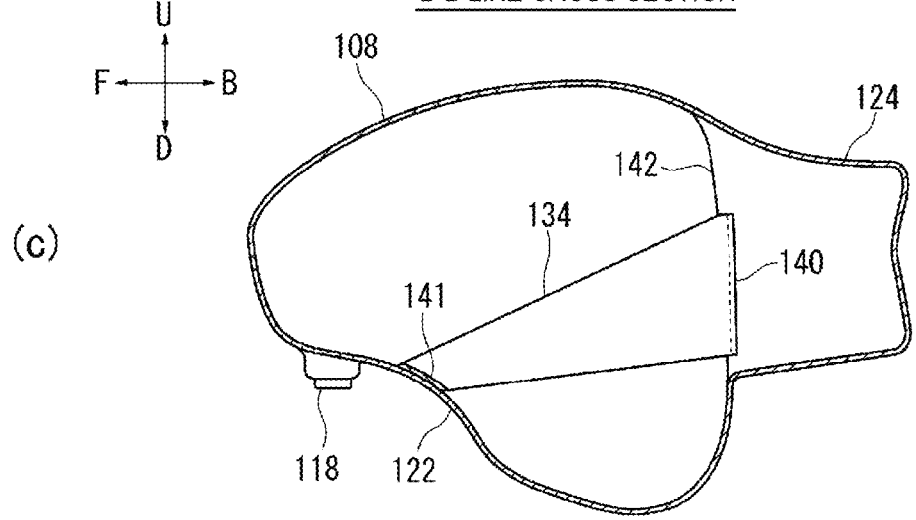
(c) C-C LINE CROSS SECTION

[FIG. 4]
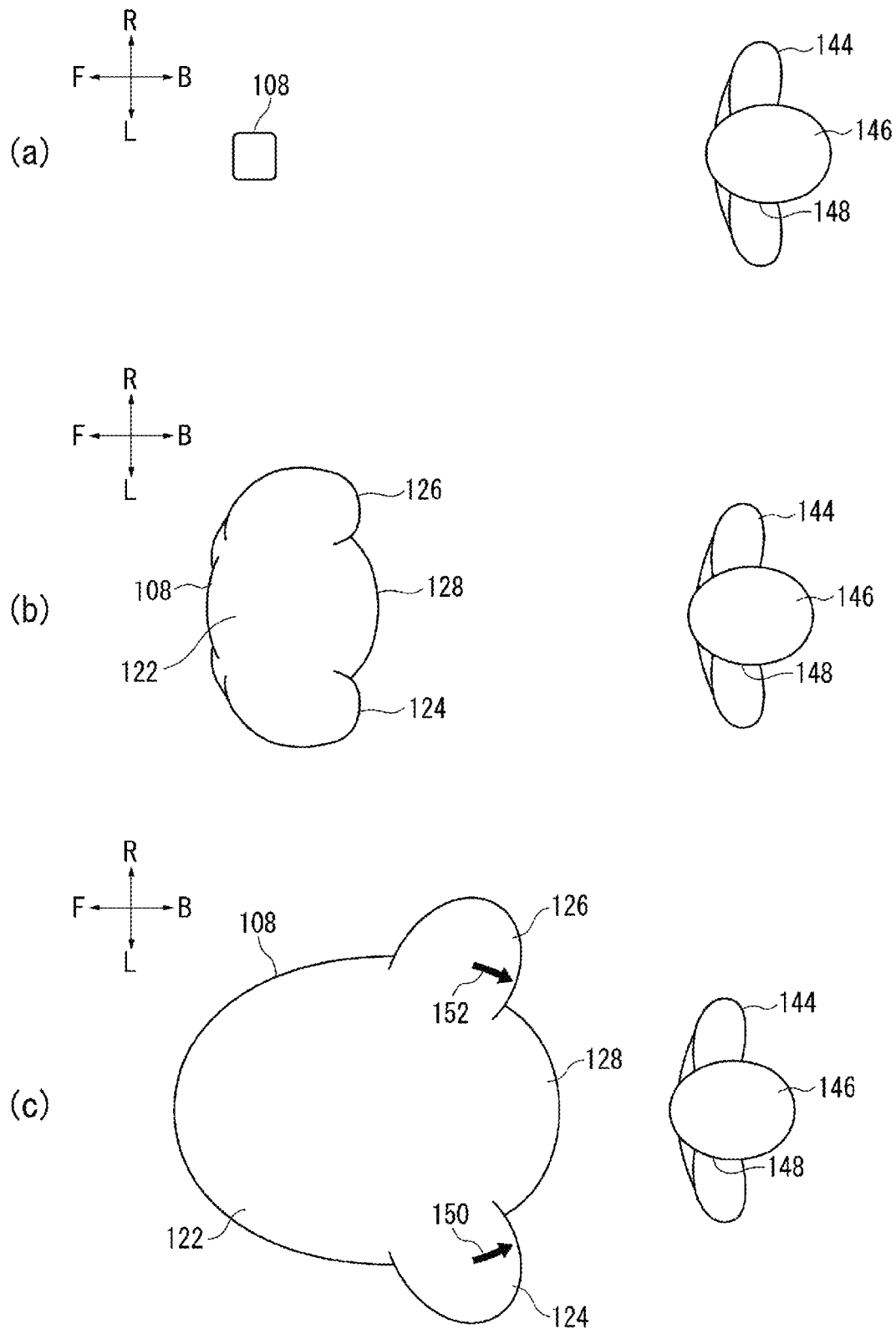

[FIG. 5]
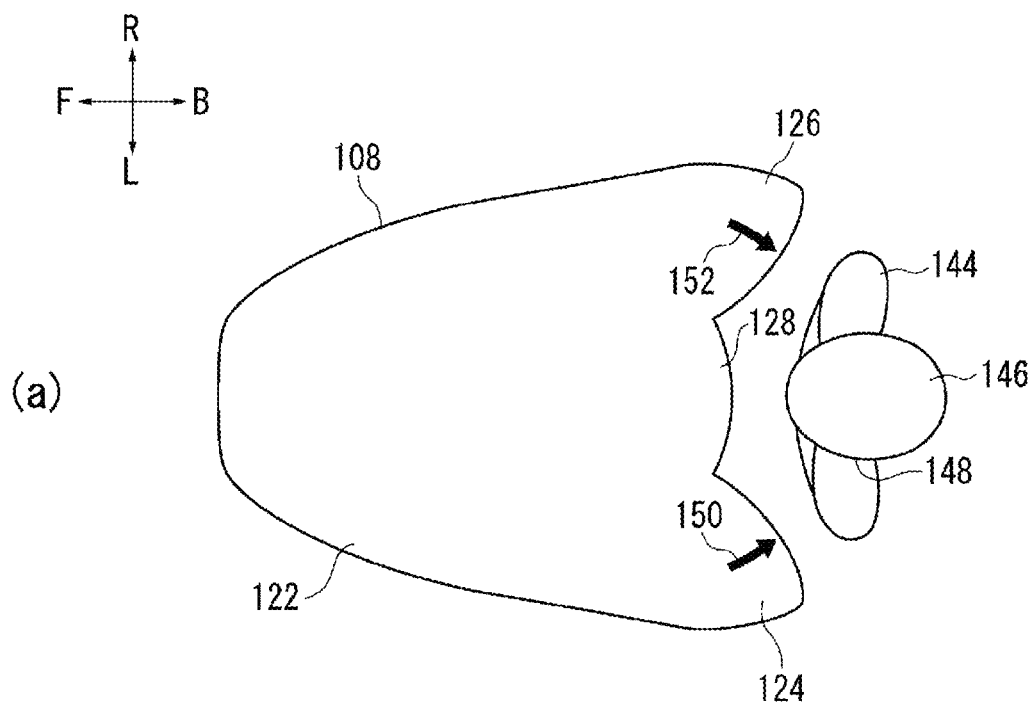
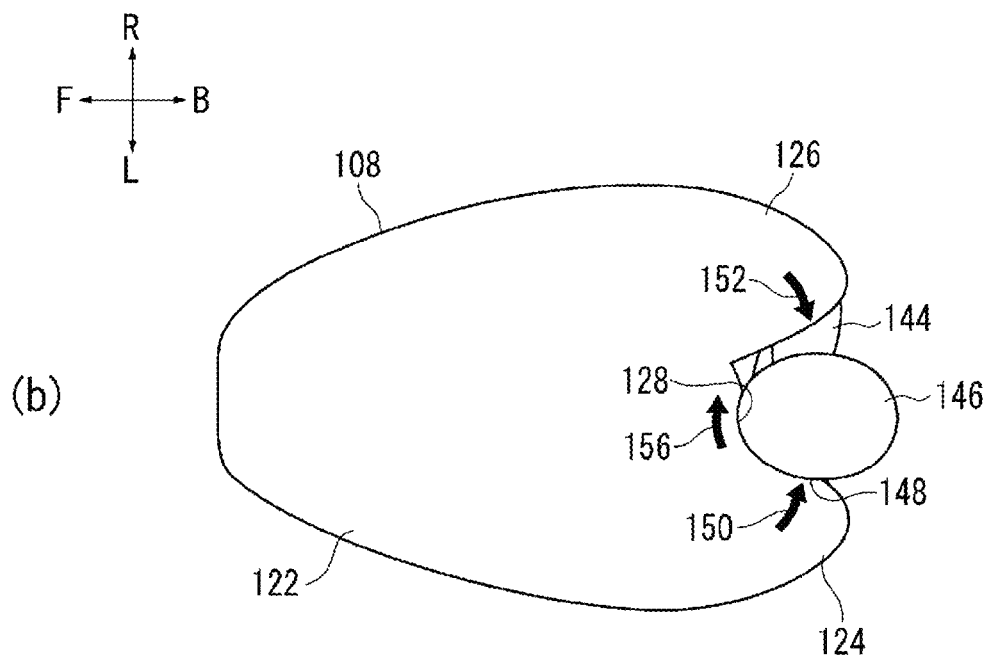

[FIG. 6]
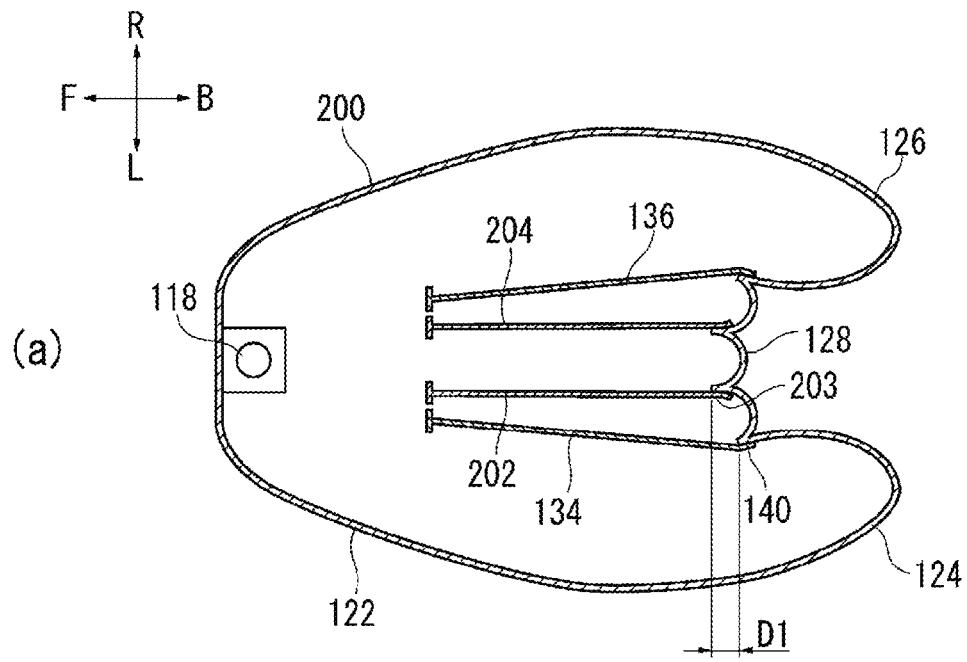
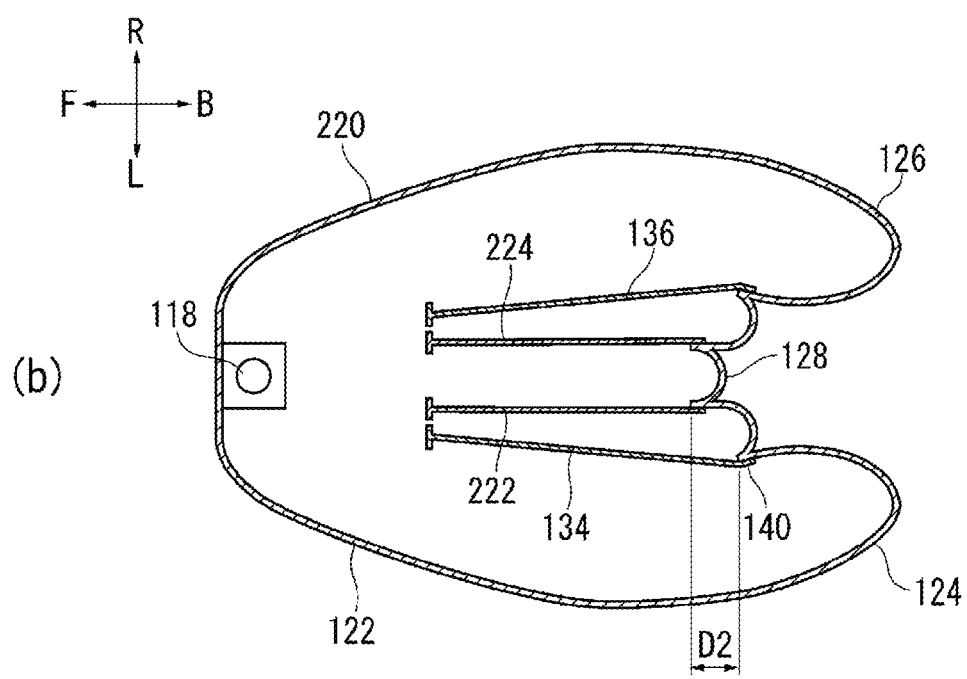

[FIG. 7]
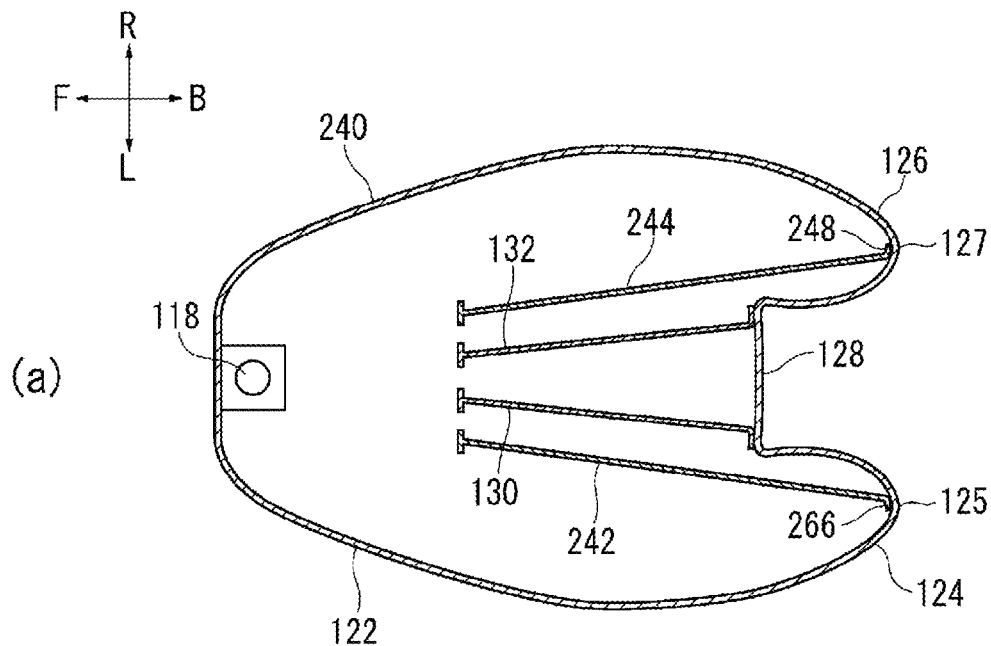
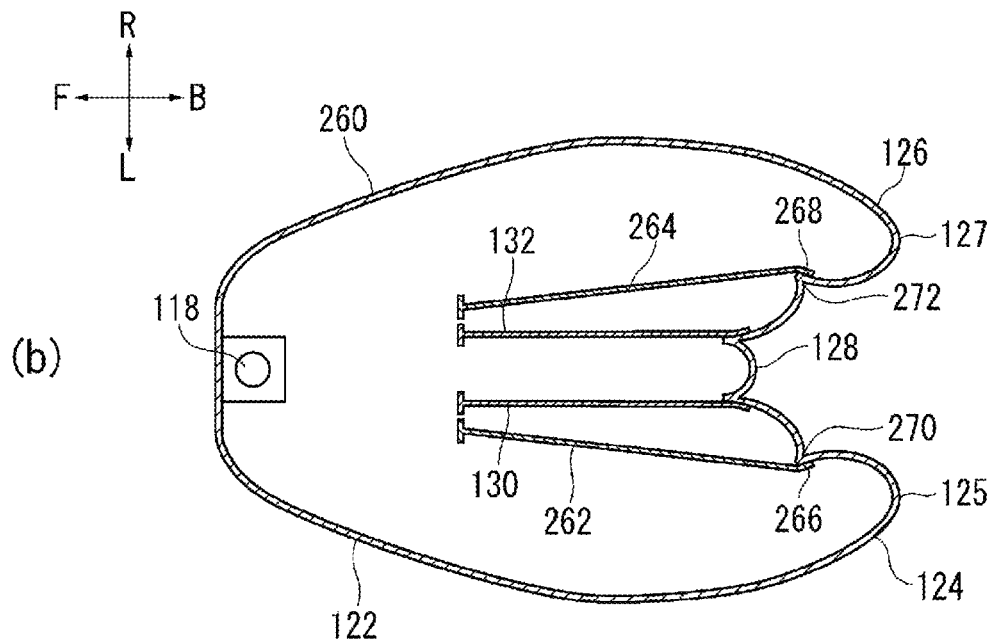

[FIG. 8]
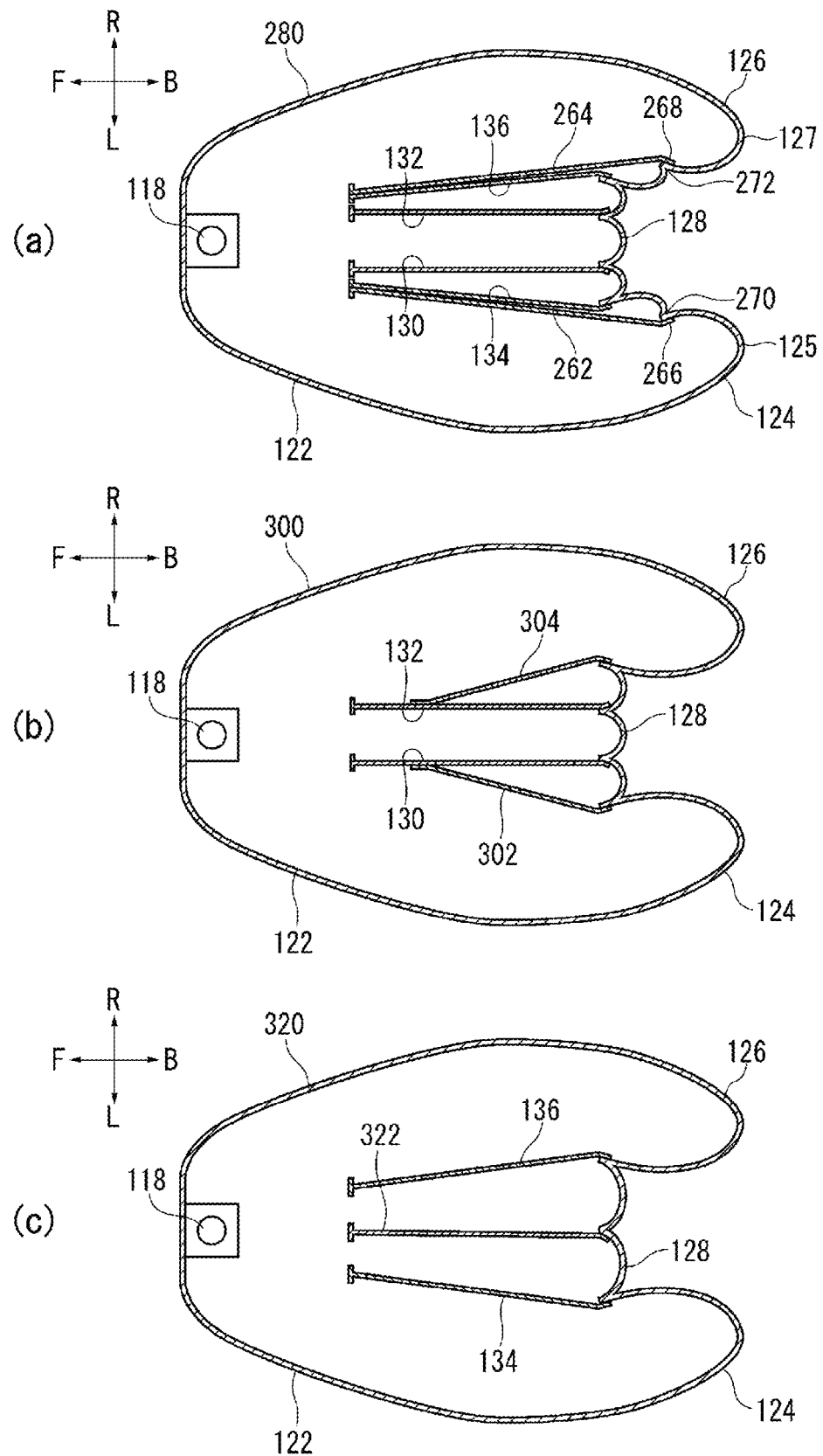

[FIG. 9]
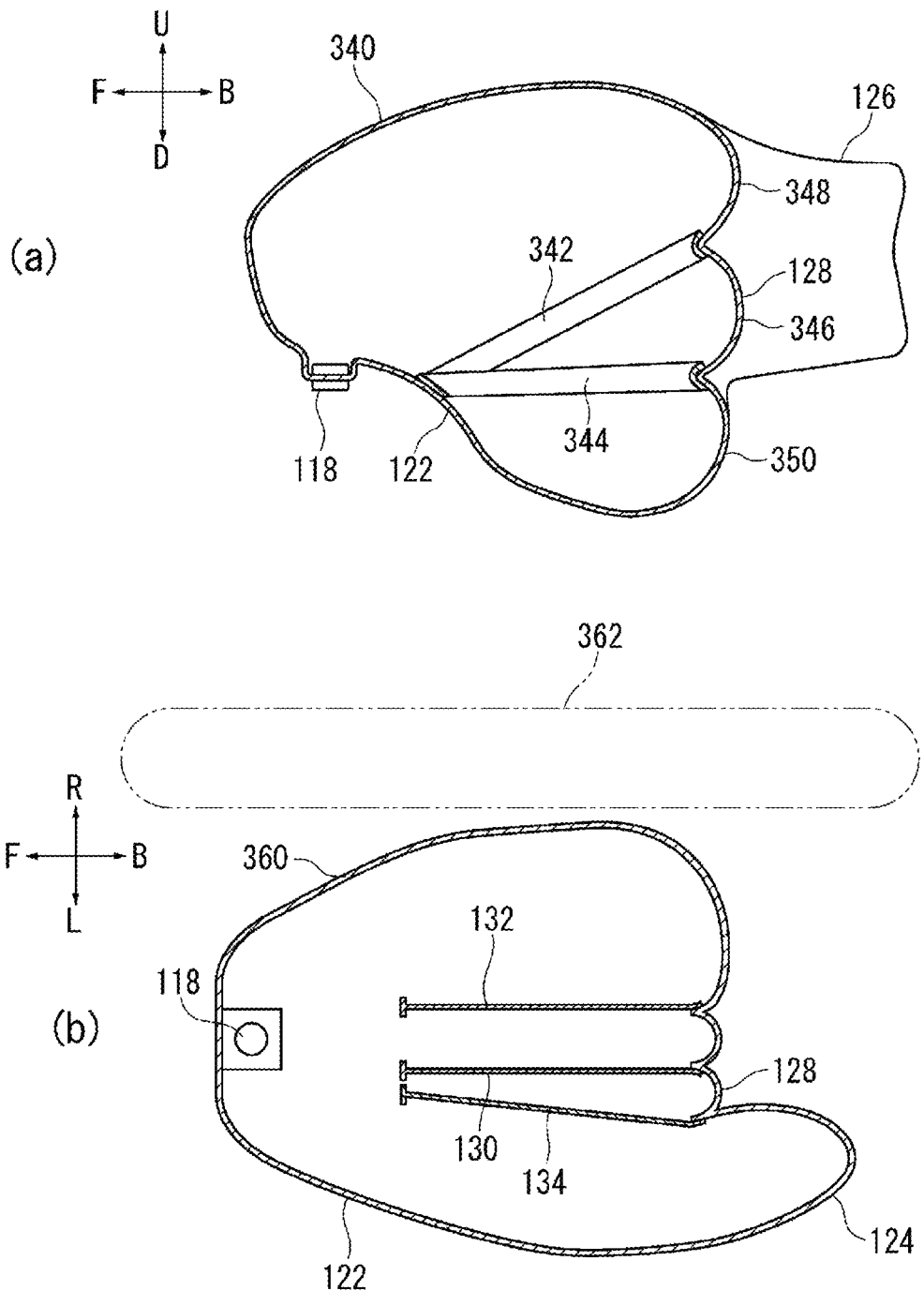

AIRBAG APPARATUS WITH PROTRUSION PARTS

TECHNICAL FIELD

The present invention relates to an airbag apparatus that includes a bag shaped cushion which is installed in a vehicle and expands and deploys from in front of a seat.

BACKGROUND

Airbag apparatuses have become standard equipment in most recent vehicles. An airbag apparatus is a safety apparatus which is operated in the event of an emergency such as a vehicle collision, and receives and protects passengers utilizing an airbag cushion which expands and deploys by gas pressure. Various kinds of airbag apparatuses are used depending on the installation position and application thereof. For example, in order to mainly protect passengers in the front seat from impact in the anteroposterior direction, a front airbag is provided in the center of the steering wheel in the driver seat, while a passenger airbag is provided in the instrument panel and peripheral part thereof in the vicinity of the passenger seat. In addition, in order to protect each passenger from a side face collision and the subsequent rollover in the anteroposterior row, a curtain airbag which expands and deploys along the side window is provided in the vicinity of the ceiling of the wall part, while a side airbag which expands and deploys immediately beside the passenger is provided on the side part of a seat.

Airbag cushions of various airbag apparatuses may be shaped in accordance with the parts of the body so as to be capable of efficiently restraining the passenger. For example, a first extension 14a and a second extension 14b for protecting the head of a passenger are provided in an airbag body 11 described in FIG. 1 of Patent Document 1. The configuration of Patent Document 1 indicates that even the side of the head can be covered and protected by the first extension 14a, etc.

RELATED ART DOCUMENTS

Patent Documents

Patent Document 1: Japanese Unexamined Patent Application Publication No. 2013-14176

SUMMARY OF THE INVENTION

Current airbags are also required to respond to irregular collisions or impacts such as a so-called oblique collision, for example, in which the impact is applied to a vehicle obliquely in the anteroposterior direction. During an oblique collision, a passenger enters an airbag cushion present in front of their seat at an irregular angle such as in the oblique direction. In this case, once the head of the passenger contacts the airbag cushion in front of the seat, rotation about the neck may occur when seen from above. Because such rotation of the head may induce an increase in the injury value of the passenger in terms of the structure of the human body, the effective prevention thereof has been requested.

The abovementioned Patent Document 1 describes that the utilization of a first extension 14a and a second extension 14b allows the head of the passenger to be protected even when the head is shifted in the width direction of the vehicle during the occurrence of an impact on the vehicle. Unfortunately, with reference to FIG. 5, etc. the first extension 14a, etc. are not so thick in the width direction of the vehicle, preventing the shape thereof from being maintained upon restraining the head of the passenger during an oblique collision.

Problem to be Solved by the Invention

The present invention has been created in view of such a problem, with an object of providing an airbag apparatus in which the injury value of a passenger can be efficiently suppressed in an emergency.

Means for Solving the Problem

In order to solve the abovementioned problem, a typical configuration of an airbag apparatus according to the present invention includes: a bag shaped cushion which is installed in a vehicle and expands and deploys from in front of a seat, wherein the cushion includes: a front restraining part which restrains the head of a passenger from the front of a vehicle; and at least one protrusion part which is provided beside the front restraining part in the width direction of the vehicle and is capable of protruding and expanding further towards the rear of the vehicle than the front restraining part, wherein the airbag apparatus further includes, inside the cushion: at least one inner tether having one end which is connected to the front restraining part and to which tension is applied to pull the front restraining part towards the front of the vehicle; and an outer tether having one end connected to the protrusion part and to which tension is applied to pull the protrusion part towards the front of the vehicle, and wherein, when tension is applied to the inner tether, force towards the inner tether is applied to the outer tether.

According to the abovementioned configuration, when the outer tether is drawn to the inner tether side, force towards the inner tether side is applied to the protrusion part, improving the restraining force of the temporal region of the head of the passenger with the protrusion part. Therefore, for example, the abovementioned protrusion part can absorb the rotation of the head of the passenger, thereby efficiently suppressing the injury value of the passenger.

The application of tension to the inner tether may be completed prior to applying tension to the outer tether. This configuration allows force towards the inner tether to be effectively applied to the outer tether.

The cushion may expand from the front towards the rear of the vehicle, wherein the outer tether may be connected to the protrusion part further to the rear of the vehicle than the inner tether. This configuration allows tension to the inner tether to potentially be applied prior to applying tension to the outer tether, making it possible to efficiently pull the outer tether towards the inner tether side.

The outer tether may be connected to the base on the inner tether side of the protrusion part. This outer tether can also effectively apply force towards the inner tether to the protrusion part.

The outer tether may be connected to the tip of the protrusion part. This outer tether can also effectively apply force towards the inner tether to the protrusion part.

The outer tether may be connected to the side part of the protrusion part on the inner tether side. This outer tether can also effectively apply force towards the inner tether to the protrusion part.

The other end of the inner tether may be connected to the part facing the front restraining part inside the cushion, wherein the other end of the outer tether may be connected to the part facing the protrusion part inside the cushion. This configuration enables the inner tether and the outer tether to efficiently pull the front restraining part and the protrusion part.

The protrusion part may be provided on both sides of the front restraining part in the width direction of the vehicle. This configuration enables the absorption of the head of the passenger on both sides in the width direction of the vehicle.

The region of the front restraining part between the two adjacent tethers included in the inner tether or the outer tether may be inflated towards the rear of the vehicle. The inflated part has a decreased curvature radius, thereby suppressing the tension of a base cloth. Therefore, the head of the passenger can be flexibly received, while the rotation of the head can also be efficiently suppressed.

Effects of the Invention

The present invention enables the provision of an airbag apparatus in which the injury value of a passenger can be efficiently suppressed in an emergency.

BRIEF DESCRIPTION OF THE DRAWINGS

FIG. 1 is a view illustrating the outline of an airbag apparatus according to an embodiment of the present invention.

FIG. 2 is a view illustrating a cushion during expansion and deployment of FIG. 1(b) in each direction.

FIG. 3 is a cross sectional view of the cushion in FIG. 2(b).

FIG. 4 is a view illustrating a process in which the cushion in FIG. 3(a) restrains a passenger.

FIG. 5 is a view illustrating a process in which the cushion in FIG. 3(a) restrains a passenger.

FIG. 6 is a view illustrating a modified example of the cushion in FIG. 3(a), etc.

FIG. 7 is a view illustrating a modified example of the cushion in FIG. 3(a), etc.

FIG. 8 is a view illustrating a modified example of the cushion in FIG. 3(a), etc.

FIG. 9 is a view illustrating a modified example of the cushion in FIG. 3(a), etc.

REFERENCE NUMERALS

100 . . . Airbag apparatus, 102 . . . Instrument panel, 104 . . . Seat, 106 . . . Housing part, 107 . . . Cover, 108 . . . Cushion, 118 . . . Inflator, 120 . . . Windshield, 122 . . . Base, 124, 126 . . . Protrusion part, 125, 127 . . . Tip of the protrusion part, 128 . . . Front restraining part, 130, 132 . . . Inner tether, 134, 136 . . . Outer tether, 138 . . . One end of the inner tether, 139 . . . Other end of the inner tether, 140 . . . One end of the outer tether, 141 . . . Other end of the outer tether, 142 Base of the protrusion part, 144 . . . Passenger, 146 . . . Head, 148 . . . Temporal region of the head, 150, 152 . . . Force applied to the protrusion part, 156 . . . Rotation of the head, 158a to 158c . . . Inflated region, 200 . . . Cushion of Modified Example 1, 202, 204 . . . Inner tether, 203 . . . Rear end of the inner tether, 220 . . . Cushion of Modified Example 2, 222, 224 . . . Inner tether, 240 . . . Cushion of Modified Example 3, 242, 244 . . . Outer tether, 246, 248 . . . Rear end of the outer tether, 260 . . . Cushion of Modified Example 4, 262, 264 . . . Outer tether, 266, 268 . . . Rear end of the outer tether, 270, 272 . . . Side part of the protrusion part, 280 . . . Cushion of Modified Example 5, 300 . . . Cushion of Modified Example 6, 302, 304 . . . Outer tether, 320 . . . Cushion of Modified Example 7, 322 . . . Inner tether, 340 . . . Cushion of Modified Example 8, 342, 344 . . . Inner tether, 346, 348, 350 . . . Inflated region, 360 . . . Cushion of Modified Example 9, 362 . . . Curtain airbag

DESCRIPTION OF THE PREFERRED EMBODIMENT

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols to omit redundant descriptions along with the illustration of elements not directly related to the present invention.

FIG. 1 is a view illustrating the outline of an airbag apparatus 100 according to an embodiment of the present invention. FIG. 1(a) is a view illustrating a vehicle prior to the operation of the airbag apparatus 100. In FIG. 1(a) and other drawings, the anteroposterior direction of the vehicle is indicated by arrows F (Forward) and B (Back), respectively, the left and right in the width direction of the vehicle are respectively indicated by arrows L (Left) and R (Right), and the vertical direction of the vehicle is indicated by arrows U (up) and D (down), respectively.

In the present embodiment, the airbag apparatus 100 is implemented as a passenger bag for a passenger seat (seat 104 on the right in the front row) in a vehicle with the steering wheel on the left side. Hereinafter, in order to provide descriptions assuming the seat 104 on the right in the front row, for example, the outside of the vehicle in the width direction of the vehicle means the right of the vehicle, while the inside of the vehicle in the width direction of the vehicle means the left of the vehicle.

An airbag cushion (hereinafter, a cushion 108 (see FIG. 1(b)) of the airbag apparatus 100 is housed in a housing part 106 provided in an instrument panel 102. The housing part 106 is installed at the front of the vehicle of the seat 104, while, in addition to the cushion 108, an inflator 118 (see FIG. 3(a)) serving as a gas generator is also housed in the housing part 106.

FIG. 1(b) is a view illustrating a vehicle after the operation of the airbag apparatus 100 in FIG. 1(a). The cushion 108 is normally housed in the housing part 106 (see FIG. 1(a)), in addition to expanding and deploying from in front of the seat 104. The cushion 108 is bag shaped and formed by overlapping and sewing; alternatively, multiple base cloths (configuring the surface thereof) are adhered and overlapped or formed by spinning and weaving using an OPW (One-Piece Woven), etc.

FIG. 2 is a view illustrating a cushion 108 during expansion and deployment of FIG. 1(b) in each direction. FIG. 2(a) is a perspective view illustrating the cushion 108 in FIG. 1(b) when seen from the lower left side at the rear of the vehicle. The cushion 108 according to the present embodiment roughly has: a base 122; and two protrusion parts 124, 126 provided on the rear of the vehicle of the base 122.

The base 122 is a part occupying the majority of the cushion 108. The face of the base 122 on the rear of the vehicle serves as a front restraining part 128, restraining the head 146 of a passenger 144 (see FIG. 5(b)) from the front of the vehicle. The protrusion parts 124, 126 are provided on both sides of the front restraining part 128 in the width direction of the vehicle and protrude and expand further towards the rear of the vehicle than the front restraining part 128, mainly restraining the temporal region of the head 148 of the passenger 144.

FIG. 2(b) is a view illustrating the cushion 108 in FIG. 1(b) when seen from the inside of the vehicle. The base 122 expands and deploys from the housing part 106 (see FIG. 1(a)) towards the rear of the vehicle so as to be embedded between the upper surface of the instrument panel 102 and the windshield 120. The protrusion parts 124, 126 are provided slightly above the rear of the vehicle of the base 122 so as to protrude from the base 122 in a shape close to a rectangle.

FIG. 3 is a cross sectional view of the cushion 108 in FIG. 2(b). FIG. 3(a) is an A-A cross sectional view of the cushion 108 in FIG. 2(b). Two kinds of tethers consisting of inner tethers 130, 132 and outer tethers 134, 136 are provided in the cushion 108 according to the present embodiment. The inner tethers 130, 132 and the outer tethers 134, 136 are members for maintaining the shape of the cushion 108 by pulling each part of the cushion 108, wherein tension is applied to both the inner tethers 130, 132 and the outer tethers 134, 136 as the cushion 108 expands and deploys. The inner tethers 130, 132 and the outer tethers 134, 136 can be provided utilizing the same material as the base cloth forming the cushion 108.

FIG. 3(b) is a B-B cross sectional view of the cushion 108 in FIG. 3(a). The inner tether 130 representing the inner tethers 130, 132 is illustrated in FIG. 3(b). Because the inner tethers 130, 132 are of the same configuration, the inner tether 130 is typically referred to.

The inner tether 130 is provided so as to gradually spread from the front to the rear of the vehicle, with one end 138 thereof bonded to the front restraining part 128. The other end 139 of the inner tether 130 is the part facing the front restraining part 128 inside the cushion 108 and is specifically connected to the bottom part on the front of the vehicle contacting the instrument panel 102 (see FIG. 1(a)). This configuration enables the inner tether 130 to efficiently pull the front restraining part 128 towards the front of the vehicle as the cushion 108 expands and deploys. This inner tether 130 can regulate the position of the front restraining part 128, in addition to improving the passenger restraining force at the front restraining part 128.

FIG. 3(c) is a C-C cross sectional view of the cushion in FIG. 3(a). The outer tether 134 representing the outer tethers 134, 136 is illustrated in FIG. 3(c). Because the outer tethers 134, 136 are of the same configuration, the outer tether 134 is typically referred to.

As illustrated in FIG. 3(c), the outer tether 134 is also provided so as to gradually spread from the front to the rear of the vehicle, with one end 140 thereof connected to a base 142 of the protrusion part 124 on the inner tether side. The other end 141 of the outer tether 134 is the part facing the protrusion part 124 inside the cushion 108 and is connected to the bottom part on the front of the vehicle contacting the instrument panel 102 (see FIG. 1(a)). This configuration allows the outer tether 134 to efficiently pull the protrusion part 124 as the cushion 108 expands and deploys, making it possible to maintain the shape protruding towards the rear of the vehicle of the protrusion part 124.

Once again in reference to FIG. 3(a). A portion of the inflator 118 is inserted into the cushion 108. The inflator 118 is operated upon receiving a detection signal of an impact from a sensor (not illustrated), so as to supply gas to the cushion 108. The cushion 108 starts to expand by the gas from the inflator 118, after which the expansion pressure thereof cleaves a cover 107 (see FIG. 1(a)) of the housing part 106, etc., and then expands and deploys towards the seat 104 so as to restrain the passenger from the front of the vehicle.

The inflator 118 is disc shaped, with a portion thereof inserted into the base 122, and fixed to a rigid part of the vehicle, such as a cross beam, inside the housing part 106 (see FIG. 1(a)). Exemplary currently prevailing inflators include: a type which is filled with a gas generating agent and burns the agent to generate gas; a type which is filled with compressed gas and supply gas without generating heat; or a hybrid type which utilizes both combustion gas and compressed gas; etc. Any type of the inflator 118 can be utilized.

The inner tethers 130, 132 and the outer tethers 134, 136 according to the present embodiment can maintain the shape of each part of the cushion 108, in addition to further improving the passenger restraining force of the protrusion parts 124, 126 when force towards the inner tethers 130, 132 side is applied to the outer tethers 134, 136 during expansion and deployment. The process by which the cushion 108 restrains the passenger 144 will hereinafter be described with reference to FIGS. 4, 5.

FIGS. 4 and 5 are views illustrating a process in which the cushion 108 in FIG. 3(a) restrains a passenger 144. As illustrated in FIG. 4(a), the cushion 108 is housed in the vehicle in front of the passenger 144 occupying the seat 104. As illustrated in FIG. 4(b), when an impact occurs on the vehicle, an operation signal is transmitted from a sensor (not illustrated) to the airbag apparatus 100, after which the cushion 108 cleaves the cover 107 (see FIG. 1(a)) so as to expand and deploy. In addition, as illustrated in FIG. 4(c), the base 122 of the cushion 108 expands, while the protrusion parts 124, 126 of the cushion 108 expands from both sides of the front restraining part 128 in the width direction of the vehicle.

As illustrated in FIG. 5(a), the cushion 108 expands from the front towards the rear of the vehicle so as to restrain the head 146 of the passenger 144 with the front restraining part 128. However, in an oblique collision, the passenger 144 may move from the seat 104 towards the front of the vehicle, in addition to moving obliquely to the front of the inside of the vehicle. Accordingly, in the present embodiment, the protrusion parts 124, 126 are provided so as to protrude from both sides of the front restraining part 128 in the width direction of the vehicle towards the rear of the vehicle.

FIG. 5(b) is a view in which the passenger 144 in FIG. 5(a) has further entered the cushion 108 side. As illustrated in FIG. 5(b), for example, if the passenger 144 moves towards the left front, the cushion 108 restrains the head 146 of the passenger 144 with the front restraining part 128 from the front of the vehicle, in addition to restraining the head 146 of the passenger 144 with the protrusion part 124 from the temporal region of the head 148 side.

As has been described with reference to FIG. 3(a), in the present embodiment, when tension is applied to the inner tethers 130, 132 so as to pull the front restraining part 128 towards the front of the vehicle, the outer tethers 134, 136 are also pulled to the inner tethers 130, 132 side via the front restraining part 128, with the force towards the inner tethers 130, 132 side applied to the outer tethers 134, 136. In addition, because the outer tethers 134, 136 are connected to the bases 142, 143 of the protrusion part 124 on the inner tethers 130, 132 side, the force towards the inner tethers 130, 132 side is also applied to the protrusion parts 124, 126 pulled by the outer tethers 134, 136. Consequently, force 150, 152 is respectively applied to the protrusion parts 124, 126 in FIG. 5(b) in the direction narrowing the interval therebetween, such that the protrusion parts 124, 126 can restrain the head 146 of the passenger 144 in such a motion so as to enclose the head 146 from both sides thereof. This operation enables the protrusion parts 124, 126 to exert high passenger restraining force on the head 146 of the passenger 144.

Here, during an oblique collision, etc., when the head 146 of the passenger 144 which moves towards the oblique front contacts the cushion 108 at the front of the seat 104, the head 146 may experience clockwise rotary force (rotation 156 indicated by arrows) about the neck when seen from above. The rotation 156 of the head 146 in this way has been found to easily increase the injury value of the passenger 144. However, in the present embodiment, the front restraining part 128 and the protrusion part 124 can positively restrain the range from the front of the head 146 to the temporal region of the head 148, decreasing or negating and absorbing the rotation 156 arising in the head 146. This configuration can decrease the angular speed of the head 146 of the rotation 156 of the passenger 144, in addition to suppressing the injury value of the head 146 caused by the rotation 156.

Once again in reference to FIG. 3(a). In the cushion 108 according to the present embodiment, in the front restraining part 128, the region 158b between the inner tethers 130, 132 or regions 158a, 158c between the inner tethers 130, 132 and the outer tethers 134, 136 is/are curved and inflated towards the rear of the vehicle.

Generally, the pressure and the curvature radius affect the tension of the base cloth. The cushion 108 expands by means of the pressure of the gas received from one inflator 118. Therefore, in accordance with the large/small relation of the curvature radius, the case in which regions 158a to 158c in which the front restraining part 128 inflated between each tether is formed exhibits a lower tension of the base cloth than the case in which the overall front restraining part 128 uniformly expands. In this way, the front restraining part 128 according to the present embodiment has the tension suppressed and can flexibly receive the head 146 of the passenger 144, in addition to efficiently suppressing the rotation 156 (see FIG. 5(b)) of the head 146.

Modified Examples

FIGS. 6 to 9 are views illustrating modified examples of the cushion 108 in FIG. 3(a), etc. Hereinafter, the same components as described above are labeled with the same symbols, with the descriptions thereof omitted. Moreover, the same names as the components described above shall have the same functions unless otherwise indicated even when labeled with different symbols.

FIG. 6(a) is a view illustrating Modified Example 1 of the cushion 108 corresponding to FIG. 3(a). In a cushion 200 illustrated in FIG. 6(a), the inner tethers 202, 204 are configured to be slightly shorter than the outer tethers 134, 136 at the front of the vehicle. Specifically, upon completion of the expansion and deployment of the cushion 200, for example, the length of the inner tether 202 is set to be shorter than the outer tether 134 by approximately the length D1, such that the rear end 203 of the inner tether 202 is connected to the front restraining part 128 more to the front of the vehicle than the rear end 140 of the outer tether 134. In other words, upon completion of the expansion and deployment of the cushion 200, the length of the outer tether 134 is set to be longer than the inner tether 202 by approximately the length D1, such that the rear end 140 of the outer tether 134 is connected to the base 142 of the protrusion part 124 more to the rear of the vehicle than the rear end 204 of the inner tether 202.

With the abovementioned configuration, when the cushion 200 expands and deploys from the front towards the rear of the vehicle, the application of tension to the inner tethers 202, 204 is completed prior to applying tension to the outer tethers 134, 136. As a result, the outer tethers 134, 136 can be efficiently drawn to the inner tethers 202, 204 side, while force towards the inner tethers 202, 204 side can be efficiently applied to the protrusion parts 124, 126.

FIG. 6(b) is a view illustrating Modified Example 2 of the cushion 108 corresponding to FIG. 3(a). In a cushion 220 illustrated in FIG. 6(b), compared with the cushion 200 in FIG. 6(a), inner tethers 222, 224 are set to be further shorter than the outer tethers 134, 136 by approximately the length D2 (D2>D1). Therefore, the application of tension to the inner tethers 222, 224 may be earlier than applying tension to the outer tethers 134, 136, making it possible to efficiently draw the outer tethers 134, 136. In this way, the lengths of the inner tethers 222, 224 and the outer tethers 134, 136 can be appropriately set taking the force applied to the protrusion parts 124, 126 into consideration.

FIG. 7(a) is a view illustrating Modified Example 3 of the cushion 108 corresponding to FIG. 3(a). In the cushion 240 illustrated in FIG. 7(a), the outer tethers 242, 244 are configured to be longer than the inner tethers 130, 132. In addition, the rear ends 246, 248 of the outer tethers 242, 244 are connected to the tips 125, 127 of the protrusion parts 124, 126 at the rear of the vehicle. These outer tethers 242, 244 can also effectively apply force towards the inner tethers 130, 132 side to the protrusion parts 124, 126.

FIG. 7(b) is a view illustrating Modified Example 4 of the cushion 108 corresponding to FIG. 3(a). Also in the cushion 260 illustrated in FIG. 7(b), the outer tethers 262, 264 are longer than the inner tethers 130, 132, wherein the rear ends 266, 268 of the outer tethers 262, 264 are connected to the side parts 270, 272 of the protrusion parts 124, 126 on the inner tethers 130, 132 side. These outer tethers 262, 264 can also effectively apply force towards the inner tethers 130, 132 side to the protrusion parts 124, 126. Specifically, the outer tethers 262, 264 allow the tips 125, 127 of the protrusion parts 124, 126 to be positioned more inwardly so as to suitably restrain the head 146 of the passenger 144 (see FIG. 5(b)).

FIG. 8(a) is a view illustrating Modified Example 5 of the cushion 108 corresponding to FIG. 3(a). In a cushion 280 illustrated in FIG. 8(a), the outer tethers 134, 136 and the outer tethers 262, 264 are installed together. In this way, the number of outer tethers provided at one protrusion part can be appropriately set.

FIG. 8(b) is a view illustrating Modified Example 6 of the cushion 108 corresponding to FIG. 3(a). In the cushion 300 illustrated in FIG. 8(b), the outer tethers 302, 304 are connected to the central parts of the inner tethers 130, 132. Because the inner tethers 130, 132 are directly fixed to the rigid part of the vehicle, such as a cross beam, the outer tethers 302, 304 are indirectly fixed to the cross beam, etc. via the inner tethers.

As mentioned above, the front of the vehicle of the inner tethers 130, 132 and the outer tethers 302, 304 may be directly or indirectly fixed to the rigid part of the vehicle such as the cross beam. As a result, the inner tethers 130, 132 and the outer tethers 302, 304 can efficiently pull the front restraining part 128 and the protrusion parts 124, 126 towards the front of the vehicle.

As a further modified example of the cushion 300, the cushion 300 is fixed to the cross beam, etc. in the vicinity of the inflator 118. Therefore, if the front ends of the inner tethers 130, 132 are not directly fixed to the cross beam, they are indirectly fixed to the cross beam also when bonded to the base cloth in the vicinity of the inflator 118 of the base 122. In this example as well, the inner tethers 130, 132 can pull the front restraining part 128, while the outer tethers 302, 304 can pull the protrusion parts 124, 126.

FIG. 8(c) is a view illustrating Modified Example 7 of the cushion 108 corresponding to FIG. 3(a). In the cushion 320 illustrated in FIG. 8(c), only one inner tether 322 is provided. Only the inner tether 322 can also draw the outer tethers 134, 136. In this way, the number of provided inner tethers can be appropriately set.

FIG. 9(a) is a view illustrating Modified Example 8 of the cushion 108 corresponding to FIG. 3(b). In the cushion 340 illustrated in FIG. 9(a), the inner tethers 342, 344 are arranged not in the width direction of the vehicle but rather in the vertical direction of the vehicle. In this way, multiple inner tethers can be provided not only in the width direction of the vehicle but also in the vertical direction of the vehicle. These inner tethers 342, 344 can also pull the front restraining part 128 so as to apply force towards the inner tethers 342, 344 to the outer tethers 134, 136 (see FIG. 3(a)).

Moreover, in the cushion 340, an inflated region 346 is formed between the inner tether 342 and the inner tether 344, while inflated regions 348, 350 are formed on both the upper and lower sides. As has been described with reference to FIG. 3(a), the case in which the front restraining part 128 is sectioned and inflated between each tether exhibits a lower tension of the base cloth than the case in which the overall front restraining part 128 uniformly expands. The inflated regions 346, 348, and 350 provided in the vertical direction of the vehicle can also flexibly receive the head 146 of the passenger 144 (see FIG. 5(b)), in addition to efficiently suppressing the rotation 156 of the head 146.

FIG. 9(b) is a view illustrating Modified Example 9 of the cushion 108 corresponding to FIG. 3(a). As in the cushion 360 illustrated in FIG. 9(b), only one protrusion part 124 can be provided. For example, in the case of a passenger bag provided on the right in the width direction of the vehicle as illustrated in FIG. 1(b), a curtain airbag 362 may be provided to the immediate left. In this case, even when the protrusion part 124 and the outer tether 134 are provided only to the left of the cushion 360 in the width direction of the vehicle (inside of the vehicle), and the protrusion part 126 (see FIG. 3(a)) is omitted to the right in the width direction of the vehicle to implement a restraint using the curtain airbag 362, the injury value of the passenger 144 (see FIG. 5(b)) towards the inside of the vehicle during an oblique collision can be efficiently suppressed to implement restraint.

In this way, the protrusion part 124 and the outer tether 134 can be provided on either side of a cushion 36 in the width direction of the vehicle to suppress the injury value of the passenger. Moreover, as long as the shape of the base 122 of the cushion 360 is maintained, the inner tethers 130, 132 can be provided on only one side of the front restraining part 128 in the width direction of the vehicle together with the outer tether 134.

While the preferred embodiments according to the present invention have been thus described in detail with reference to the appended drawings, needless to say, the present invention is not limited to the examples according to the present invention. Those skilled in the art may clearly consider various modified examples or correction examples within the scope described in the Scope of the Patent Claims, which are also naturally understood to belong within the technical scope of the present invention.

INDUSTRIAL APPLICABILITY

The present invention may be utilized in an airbag apparatus that includes a bag shaped cushion which is installed in a vehicle and expands and deploys from in front of a seat.

The invention claimed is:

1. An airbag apparatus, comprising a bag shaped cushion which is installed in a vehicle and expands and deploys from in front of a seat;
    the cushion comprising:
    a front restraining part configured to restrain a head of a passenger from a front of the vehicle; and
    at least one protrusion part which is provided beside the front restraining part in a width direction of the vehicle and is capable of protruding and expanding further towards a rear of the vehicle than the front restraining part; and
    the airbag apparatus further comprising, inside the cushion:
    two inner tethers each having a first end which is connected to the front restraining part and to which tension is applied to pull the front restraining part towards the front of the vehicle and a second end which is connected to a bottom inside part of the cushion; and
    an outer tether having a first end connected to the protrusion part and to which tension is applied to pull the protrusion part towards the front of the vehicle;
    wherein, when tension is applied to the two inner tethers, force towards the two inner tethers is applied to the outer tether, and
    wherein a region of the front restraining part between the two inner tethers is curved and inflated towards the rear of the vehicle.

2. The airbag apparatus according to claim 1, wherein an application of tension to the two inner tethers is completed prior to applying tension to the outer tether.

3. The airbag apparatus according to claim 2, wherein:
    the cushion expands from the front towards the rear of the vehicle, and
    the outer tether is connected to the protrusion part further to the rear of the vehicle than the two inner tethers.

4. The airbag apparatus according to claim 2, wherein the outer tether is connected to a base on an inner tether side of the protrusion part.

5. The airbag apparatus according to claim 2, wherein the outer tether is connected to a tip of the protrusion part.

6. The airbag apparatus according to claim 2, wherein the outer tether is connected to a side part on an inner tether side of the protrusion part.

7. The airbag apparatus according to claim 2, wherein the protrusion part is provided on both sides of the front restraining part in the width direction of the vehicle.

8. The airbag apparatus according to claim 1, wherein:
    the cushion expands from the front towards the rear of the vehicle, and
    the outer tether is connected to the protrusion part further to the rear of the vehicle than the two inner tethers.

9. The airbag apparatus according to claim 8, wherein the outer tether is connected to a base on an inner tether side of the protrusion part.

10. The airbag apparatus according to claim 8, wherein the outer tether is connected to a tip of the protrusion part.

11. The airbag apparatus according to claim 8, wherein the outer tether is connected to a side part on an inner tether side of the protrusion part.

12. The airbag apparatus according to claim 1, wherein the outer tether is connected to a base on an inner tether side of the protrusion part.

13. The airbag apparatus according to claim 1, wherein the outer tether is connected to a tip of the protrusion part.

14. The airbag apparatus according to claim 1, wherein the outer tether is connected to a side part on an inner tether side of the protrusion part.

15. The airbag apparatus according to claim 1, wherein:
 a second end of the outer tether is connected to a bottom inside part of the cushion.

16. The airbag apparatus according to claim 1, wherein the protrusion part is provided on both sides of the front restraining part in the width direction of the vehicle.

\* \* \* \* \*